Figure 1:
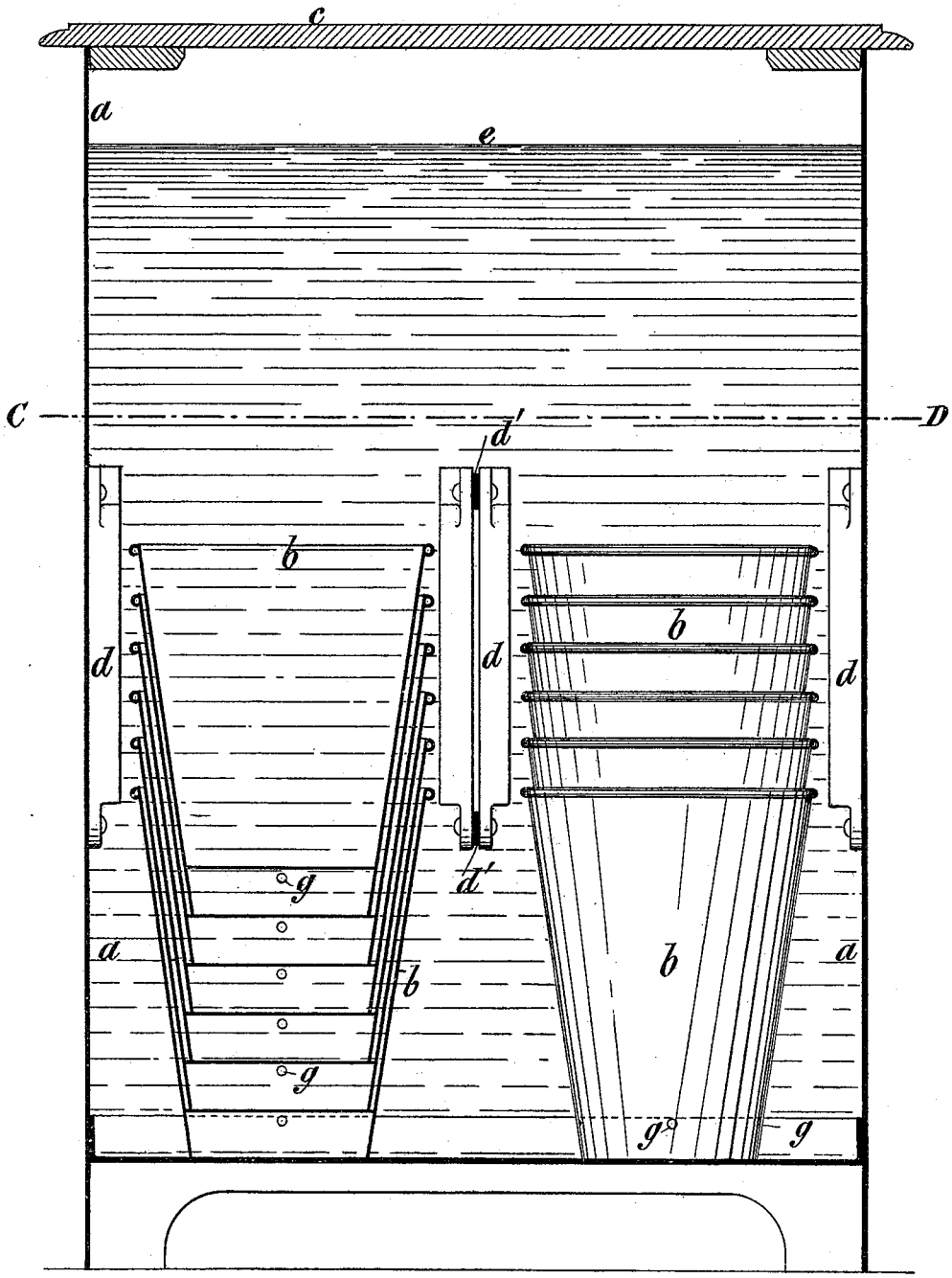

(No Model.) 14 Sheets—Sheet 1.

F. A. MESSER & W. F. THORPE.
APPARATUS FOR STORING PAILS WITH WATER OR OTHER LIQUIDS.

No. 405,900. Patented June 25, 1889.

(No Model.) 14 Sheets—Sheet 2.

F. A. MESSER & W. F. THORPE.
APPARATUS FOR STORING PAILS WITH WATER OR OTHER LIQUIDS.

No. 405,900. Patented June 25, 1889.

(No Model.) 14 Sheets—Sheet 3.

F. A. MESSER & W. F. THORPE.
APPARATUS FOR STORING PAILS WITH WATER OR OTHER LIQUIDS.

No. 405,900. Patented June 25, 1889.

(No Model.) 14 Sheets—Sheet 4.

F. A. MESSER & W. F. THORPE.
APPARATUS FOR STORING PAILS WITH WATER OR OTHER LIQUIDS.

No. 405,900. Patented June 25, 1889.

(No Model.) 14 Sheets—Sheet 5.
F. A. MESSER & W. F. THORPE.
APPARATUS FOR STORING PAILS WITH WATER OR OTHER LIQUIDS.
No. 405,900. Patented June 25, 1889.

Witnesses:
J. A. Rutherford.
Dennis Sumby.

Inventors:
Frederick A. Messer and Walter F. Thorpe
By James L. Norris.
Atty.

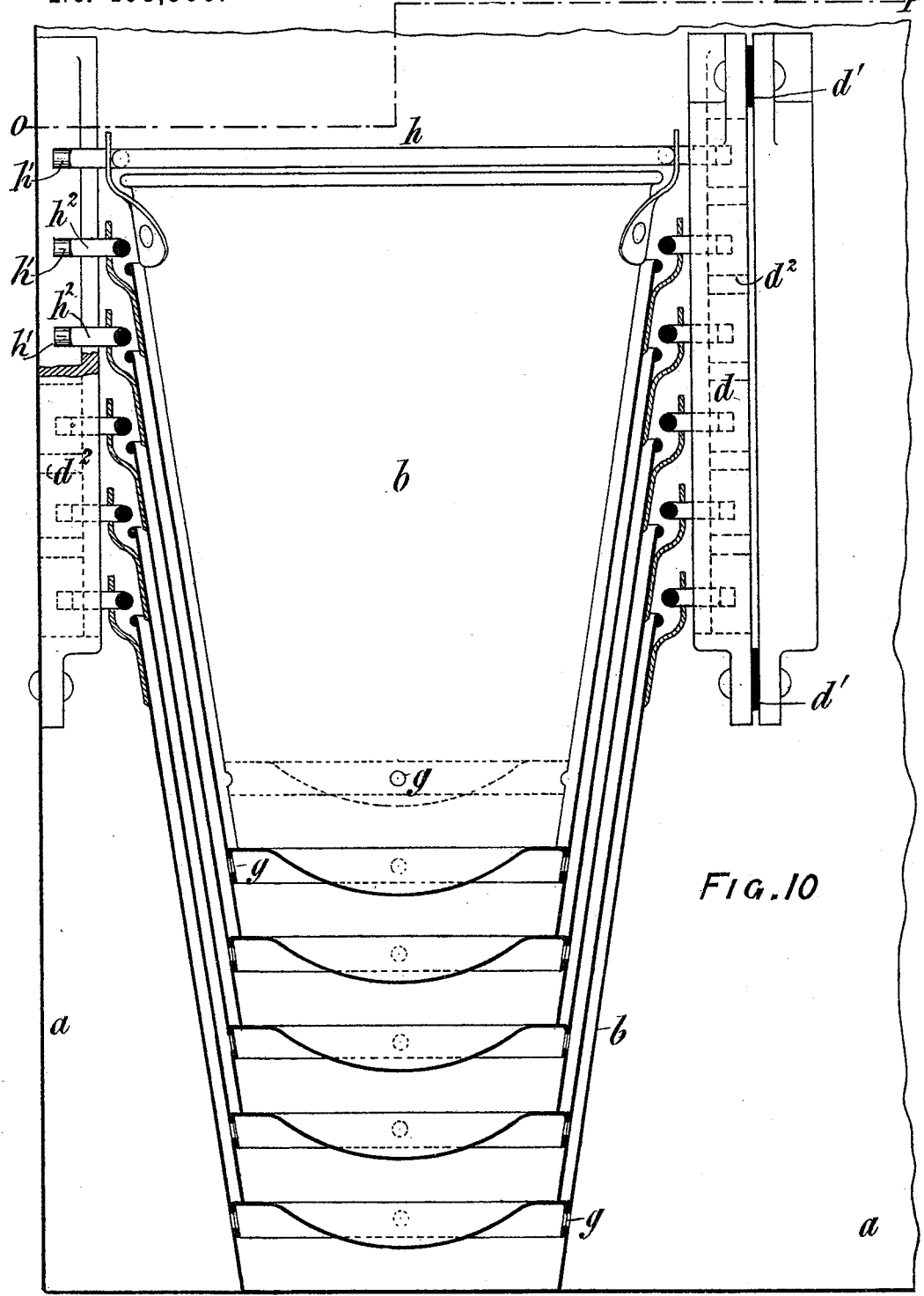

(No Model.) 14 Sheets—Sheet 7.
F. A. MESSER & W. F. THORPE.
APPARATUS FOR STORING PAILS WITH WATER OR OTHER LIQUIDS.
No. 405,900. Patented June 25, 1889.
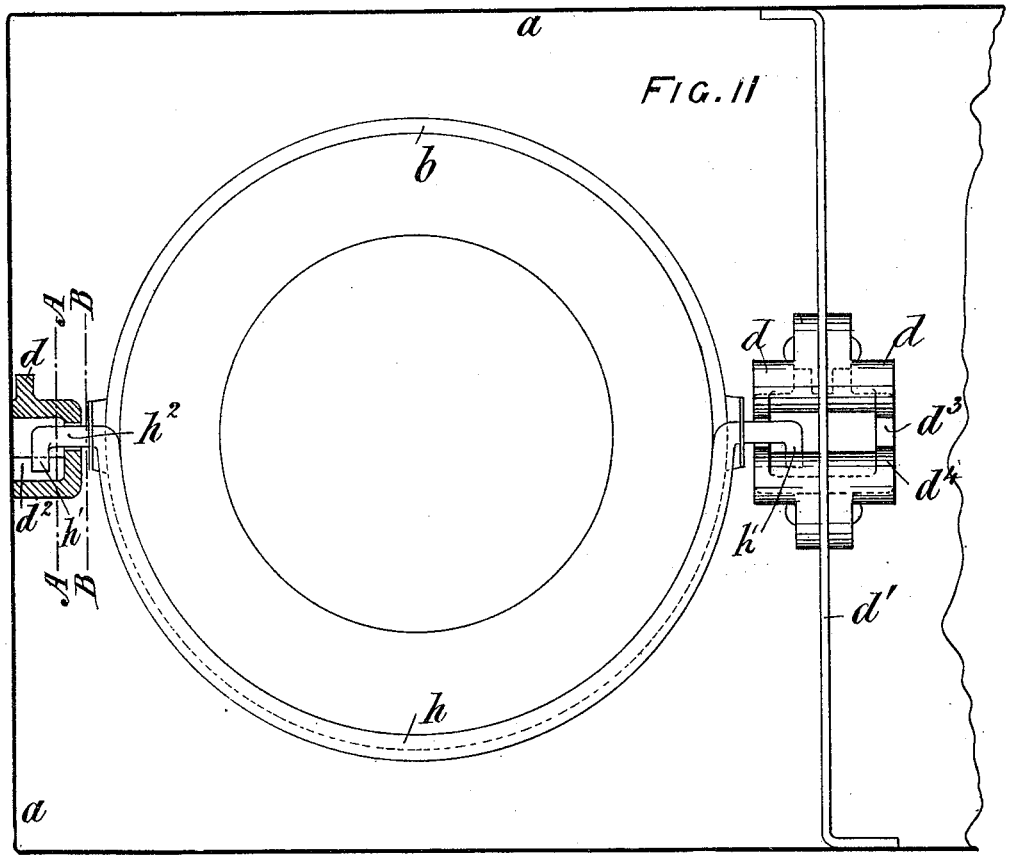
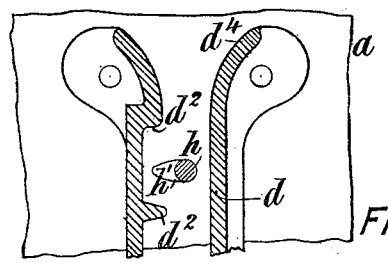
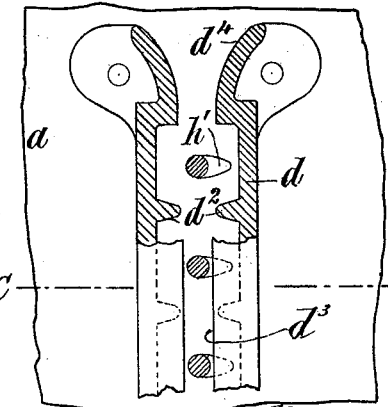
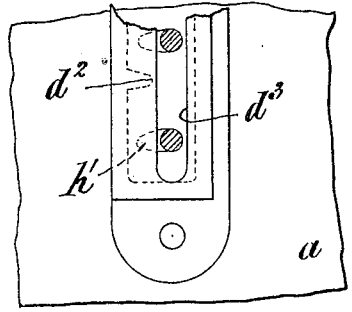

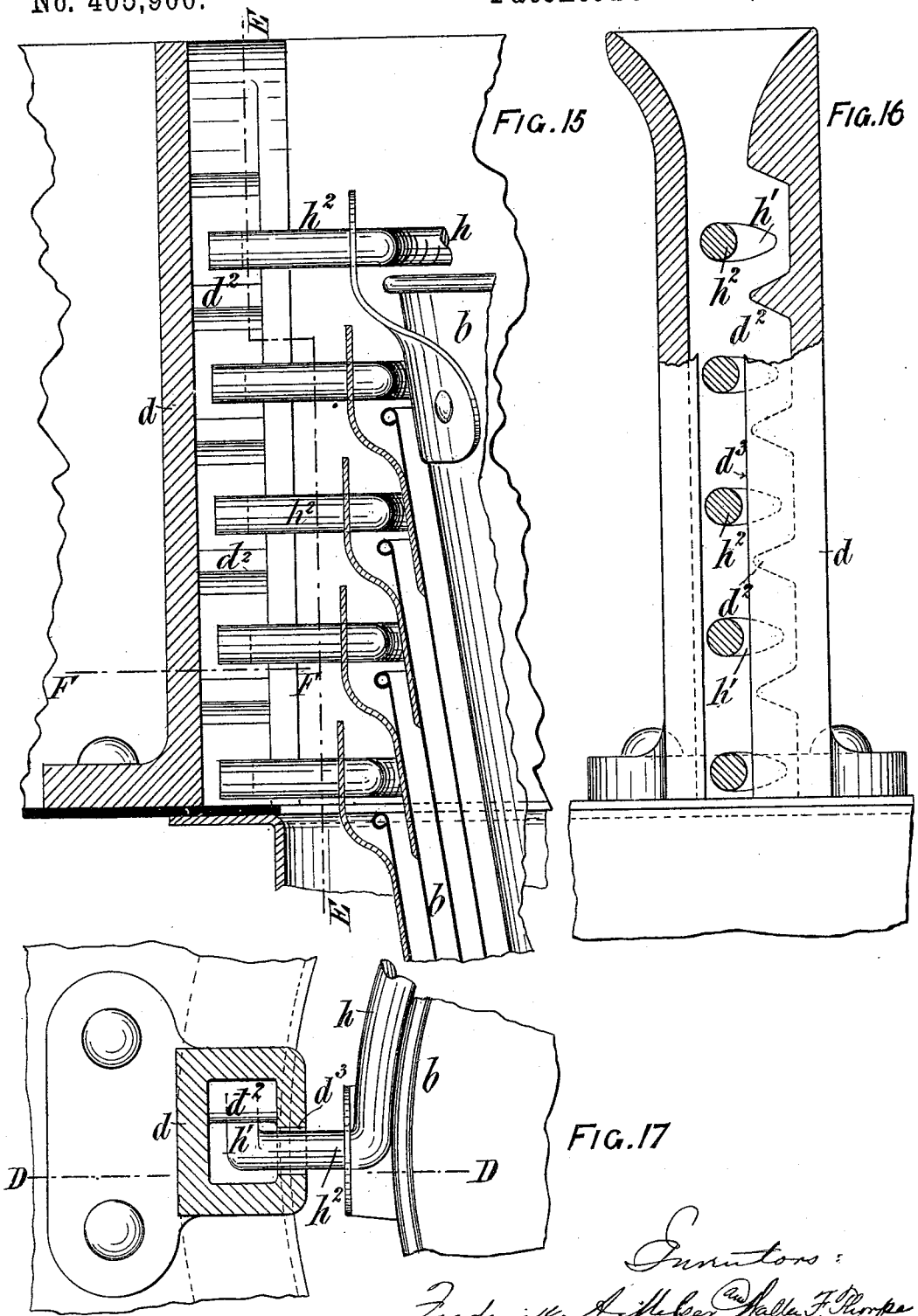

(No Model.) 14 Sheets—Sheet 9.

F. A. MESSER & W. F. THORPE.
APPARATUS FOR STORING PAILS WITH WATER OR OTHER LIQUIDS.

No. 405,900. Patented June 25, 1889.

(No Model.) 14 Sheets—Sheet 10.
F. A. MESSER & W. F. THORPE.
APPARATUS FOR STORING PAILS WITH WATER OR OTHER LIQUIDS.
No. 405,900. Patented June 25, 1889.

(No Model.) 14 Sheets—Sheet 11.
F. A. MESSER & W. F. THORPE.
APPARATUS FOR STORING PAILS WITH WATER OR OTHER LIQUIDS.
No. 405,900. Patented June 25, 1889.
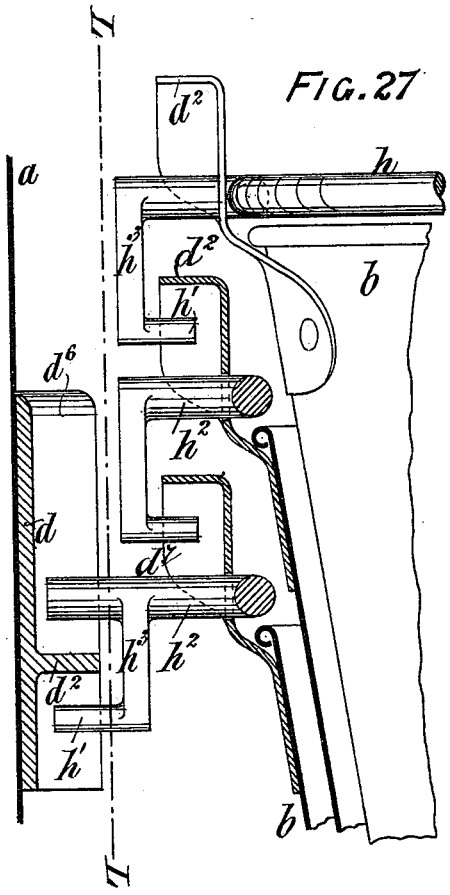
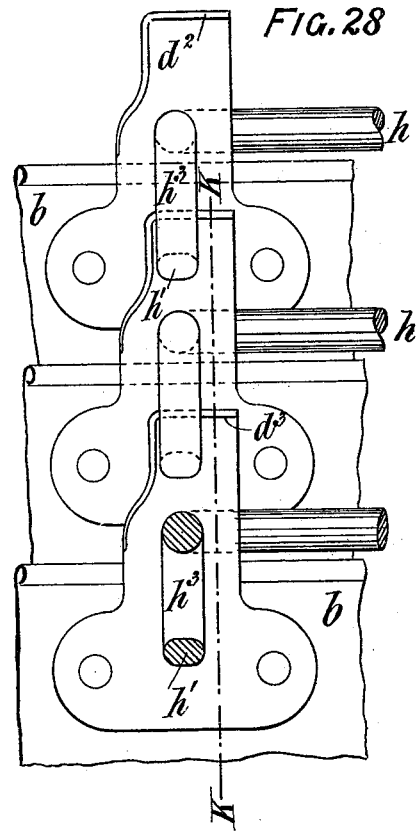
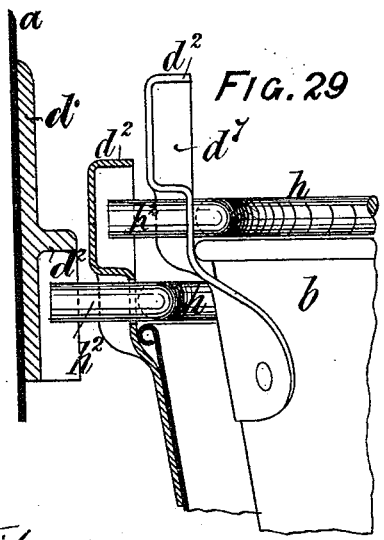
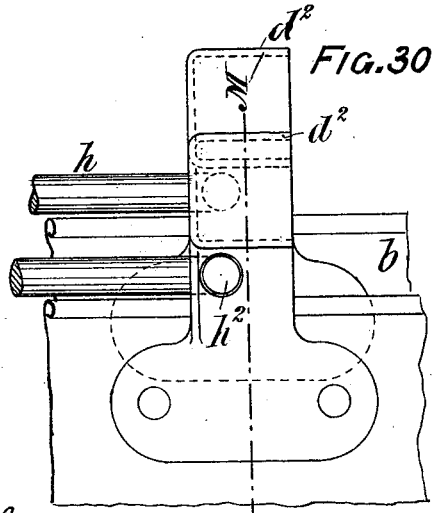

(No Model.) 14 Sheets—Sheet 12.

F. A. MESSER & W. F. THORPE.
APPARATUS FOR STORING PAILS WITH WATER OR OTHER LIQUIDS.

No. 405,900. Patented June 25, 1889.

(No Model.) 14 Sheets—Sheet 13.
F. A. MESSER & W. F. THORPE.
APPARATUS FOR STORING PAILS WITH WATER OR OTHER LIQUIDS.
No. 405,900. Patented June 25, 1889.
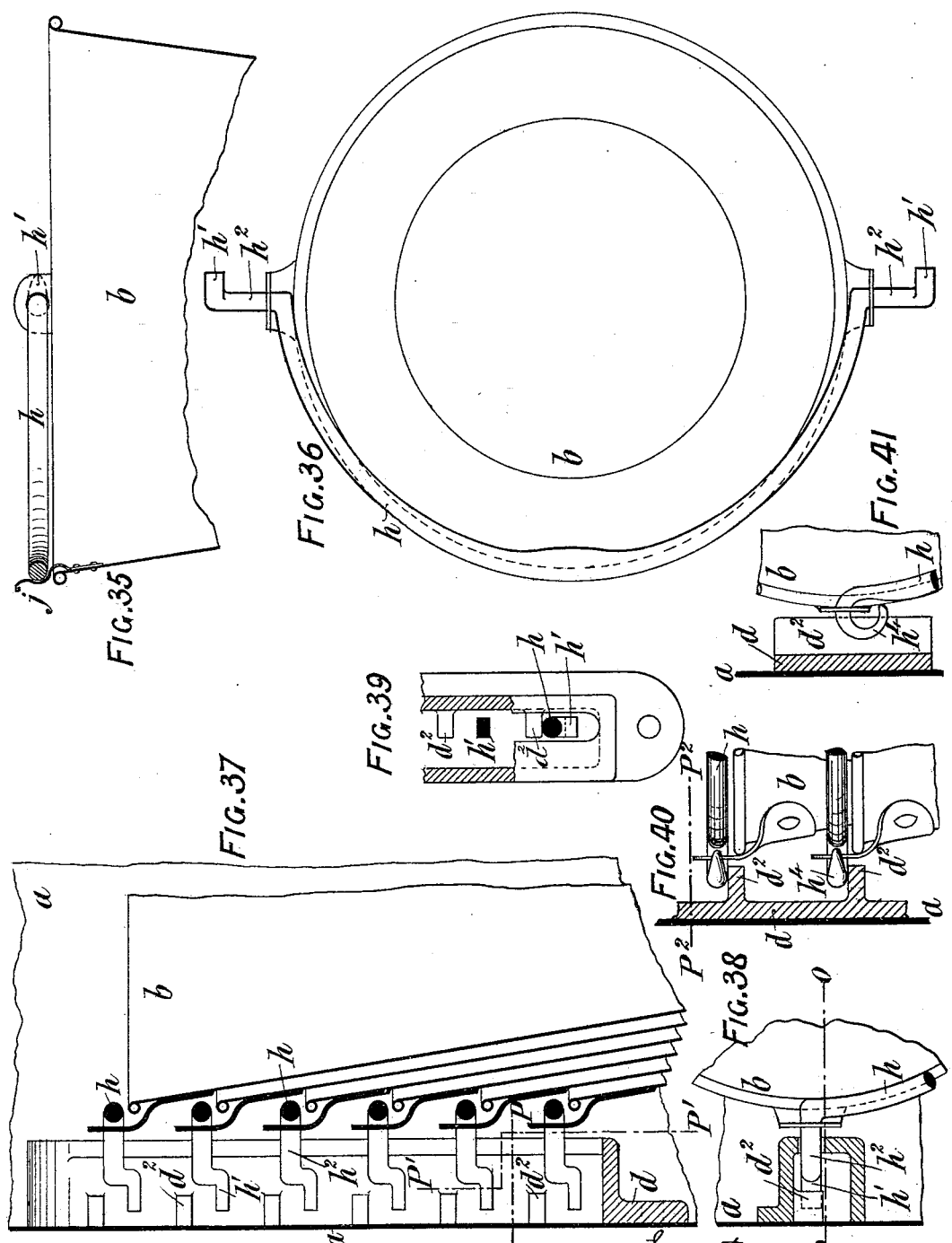

(No Model.) 14 Sheets—Sheet 14.
F. A. MESSER & W. F. THORPE.
APPARATUS FOR STORING PAILS WITH WATER OR OTHER LIQUIDS.
No. 405,900. Patented June 25, 1889.
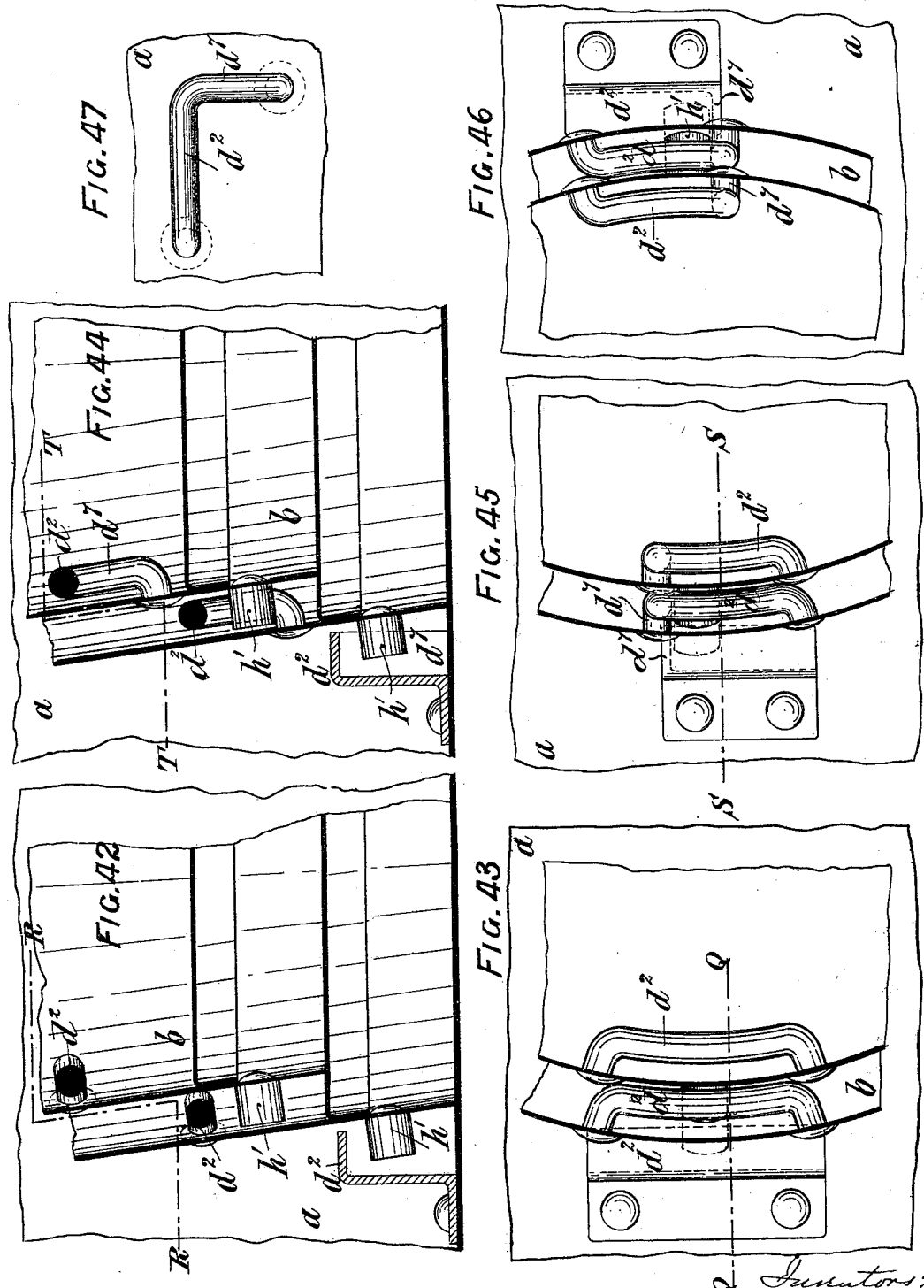

UNITED STATES PATENT OFFICE.

FREDERICK ALFRED MESSER AND WALTER FULLER THORPE, OF LONDON, ENGLAND.

APPARATUS FOR STORING PAILS WITH WATER OR OTHER LIQUIDS.

SPECIFICATION forming part of Letters Patent No. 405,900, dated June 25, 1889.

Application filed April 2, 1889. Serial No. 305,730. (No model.) Patented in England June 23, 1888, No. 9,203.

*To all whom it may concern:*

Be it known that we, FREDERICK ALFRED MESSER and WALTER FULLER THORPE, engineers, subjects of the Queen of Great Britain, respectively residing at 8 Quality Court, Chancery Lane, London, England, have invented a new and useful Improved Method of and Apparatus for Storing Pails with Water or other Liquid for Use in Fire-Extinguishing and for other Purposes, (for which we have obtained a patent in Great Britain, No. 9,203, bearing date June 23, 1888,) of which the following is a specification.

The object of our invention is to manufacture an improved apparatus which may always be kept in readiness for extinguishing accidental fires in dwelling-houses, warehouses, and other buildings, and on board ship.

Our invention consists of a magazine of buckets or pails (hereinafter referred to as "pails") packed telescopically one within the other, the whole of the pails being submerged in a suitable tank or cistern (hereinafter referred to as the "tank") containing water or other fluid or mixture (hereinafter referred to as "water.") The tank may be incased in a sideboard or other ornamental and useful article of furniture, or embellished as such, or otherwise arranged for immediate use when required. The pails, being placed within each other telescopically, occupy a minimum amount of space in the before-mentioned tank, but from which each pail can be rapidly and in succession withdrawn full of water. The level or head of water in the tank is such that on the simple withdrawal of the pails in succession each one emerges full of water; for on the withdrawal of the uppermost pail of the series from its telescopic position in the pail below it the water in the tank passes into this latter (the next pail) and fills the same, which operation is repeated with the following pail, and so on to the last or lowermost pail of the series.

The above-mentioned level or head is so arranged that when all the pails except the last one have been withdrawn the level or height of the water remaining in the tank is on a level with or just above the top rim of the last pail, the pail itself being also necessarily full. When the last pail is removed from the reservoir, the residue consists only of the quantity of water that was contained within the space between the last pail and the tank, or thereabout.

We sometimes prefer to form the lower part of the tank in conformity with the shape or configuration of the pails, the upper portion of the tank or reservoir taking the same or any other suitable or convenient form. Where more than one series of pails is used, we prefer to construct the tank (in horizontal section) either oblong, elliptical, or of other suitable and convenient form or shape. In this case we sometimes place in the tank a division plate or partition between the series of pails. The pails used in the series can be either all of one size or graduated in size, or a combination of both may be employed.

Where the pails fit so closely to each other as to produce on the rapid withdrawal of a pail a tendency to lift the next pail, we fit in the tank a series of stops, which engage with suitably-constructed projections on the handles or other parts of the pails, and thereby counteract such tendency. We sometimes attain the same object by placing the stops for the uppermost pail on the next consecutive pail below it, and so on throughout the series, the stops belonging to the lowermost pail only being attached to the tank. In this latter case we sometimes arrange the projections and stops at the lower part of the pails, instead of at the top of the same.

The disengagement from the above-mentioned stops and projections takes place when the handles of the pails are lifted from their horizontal to their vertical position, or by giving a slight rotary movement to the pails when the handles are in a vertical position.

We sometimes, in conjunction with the above, provide a hand-pump, syringe, or mop for more effectually applying the water, the handle of the mop being by preference telescopic, or having a jointed handle, for the more convenient stowage of the same in the tank. The cover is made readily detachable, so that no delay may arise in removing the same.

Where the bottoms of the pails are raised above the bottom band or foot-rim, so as to produce a cavity below the bottom of the pail, we perforate or notch the band or rim to allow the imprisoned air to escape and the water in the tank to have free access to the cavity, so as to fill the same and prevent waste of cubical space.

We sometimes provide the lower part or bottom of the tank with a suitable tap or valve for the purpose of drawing off the water, if desired.

Our invention is applicable to other useful purposes where a rapid supply of water in pails is required.

To prevent condensation taking place on the outside surface of the tank, we sometimes cover the same with wood, felt, or other suitable materials.

In order that our said invention may be particularly described and ascertained, reference is hereby made to the accompanying drawings, in which similar letters of reference indicate corresponding or equivalent parts.

Figure 2:
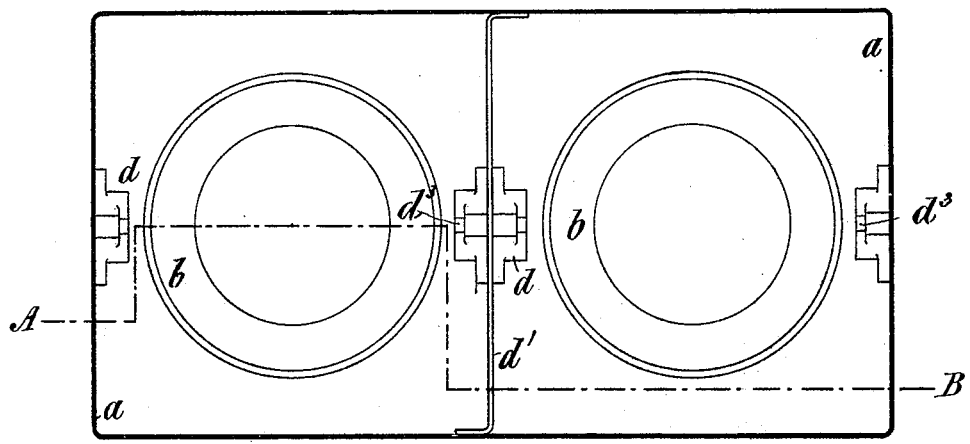
Figure 3:
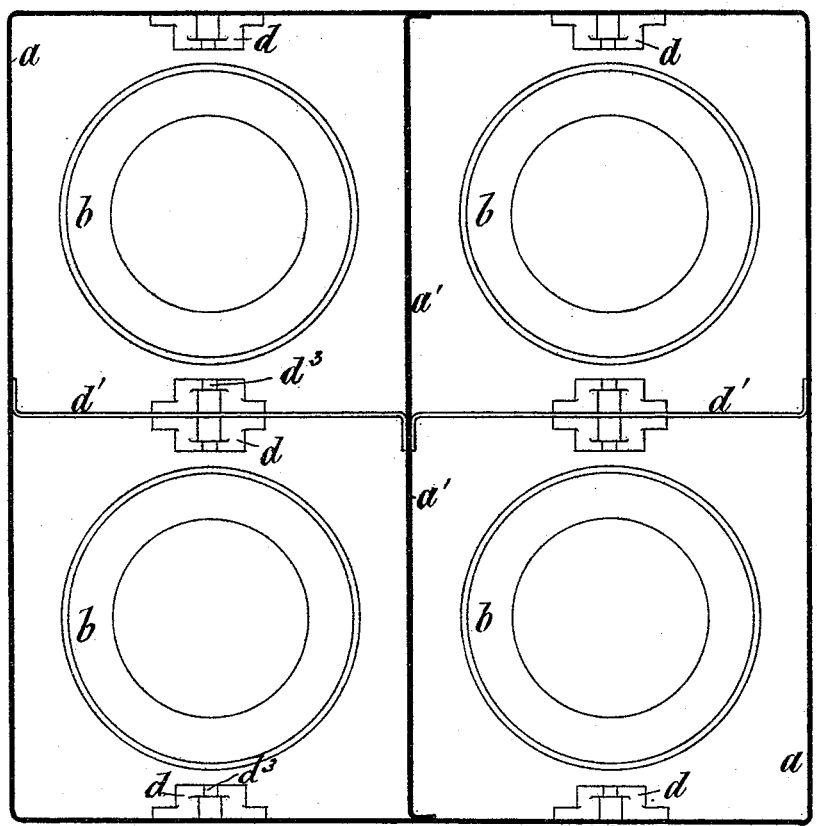
Figure 5:
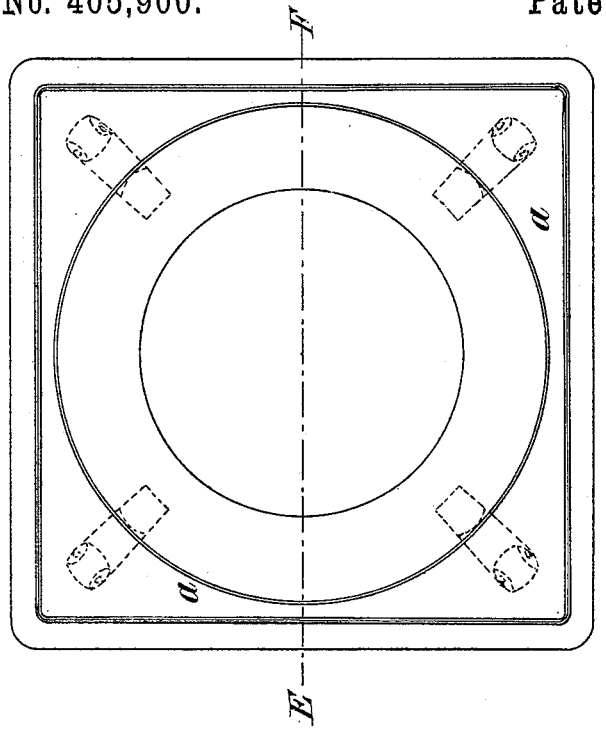
Figure 4:
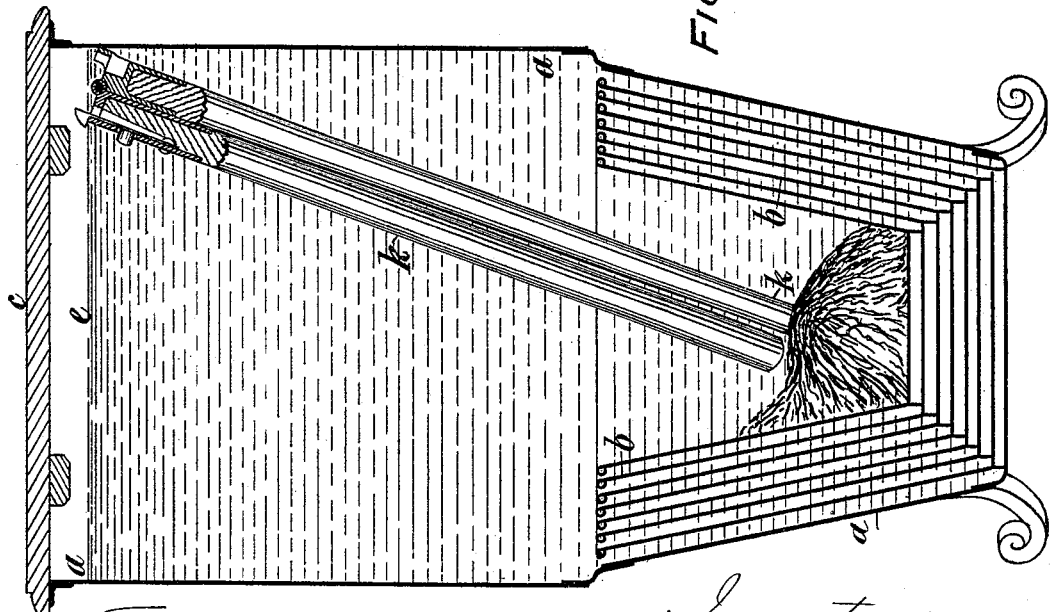
Figure 6:
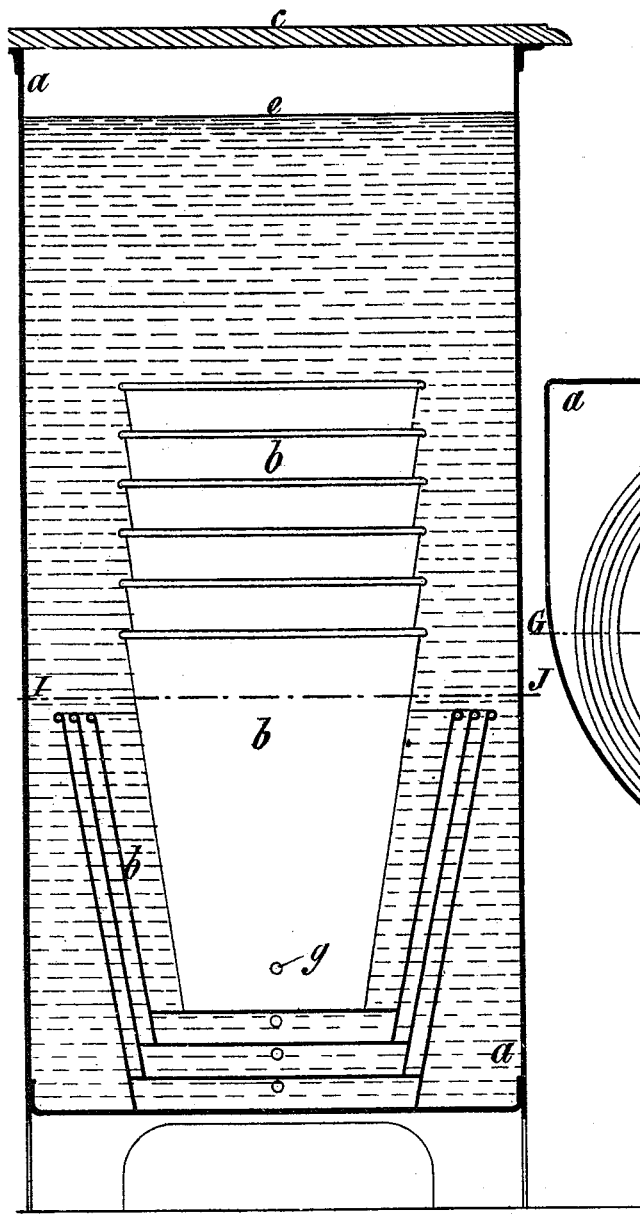
Figure 7:
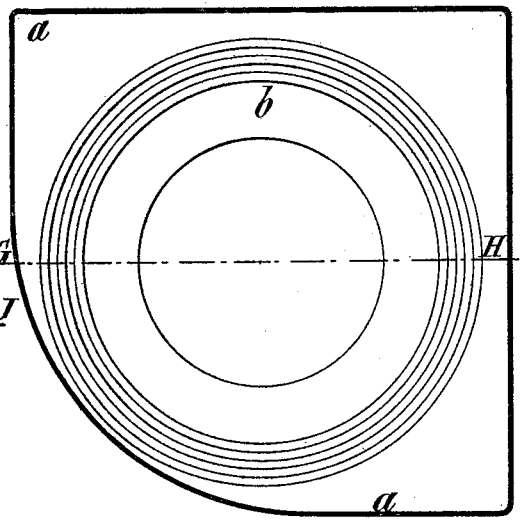
Figure 8:
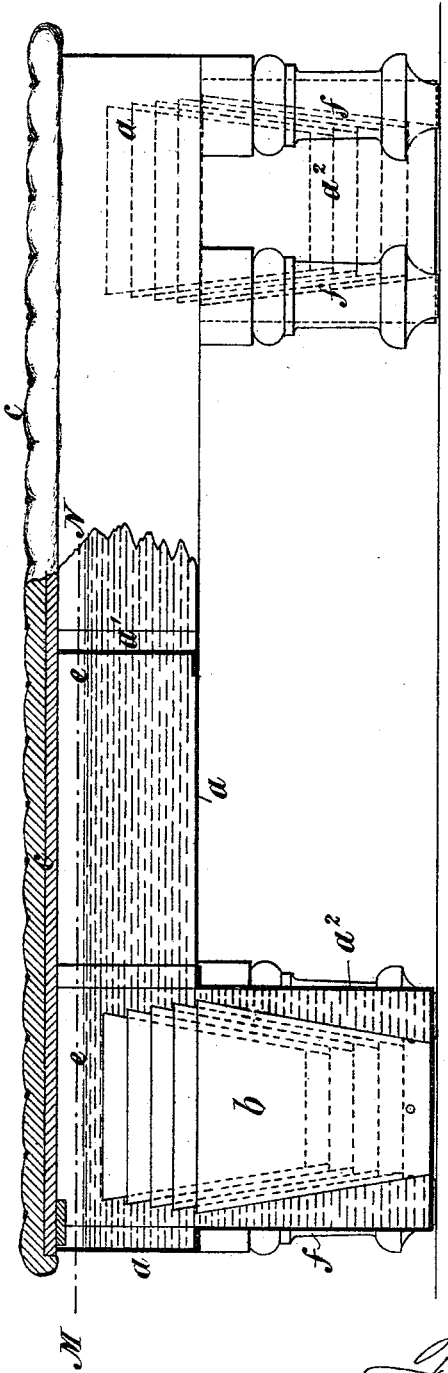
Figure 9:
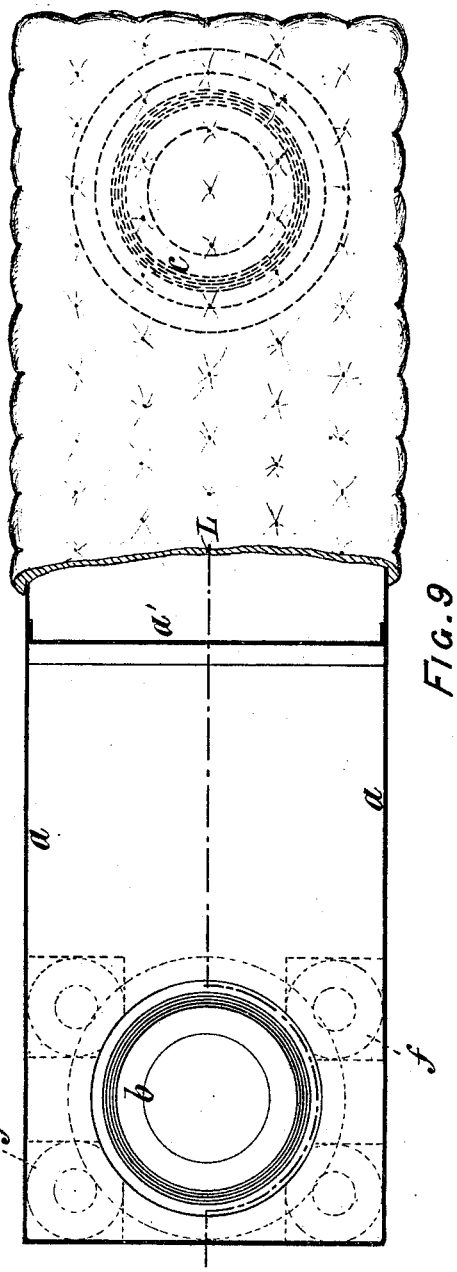
Figure 18:
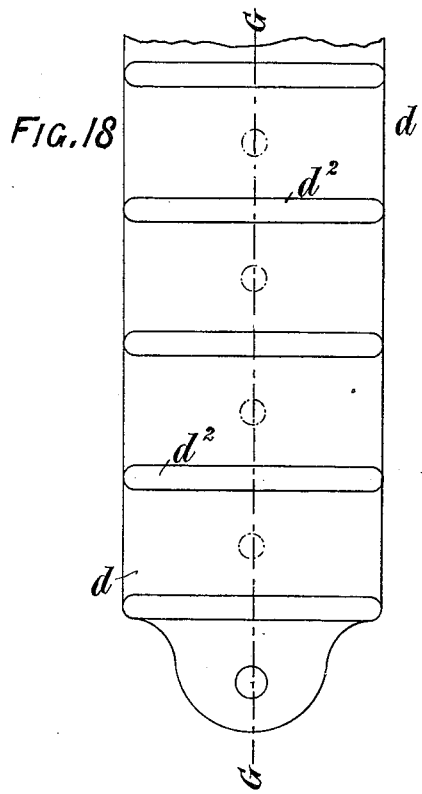
Figure 19:
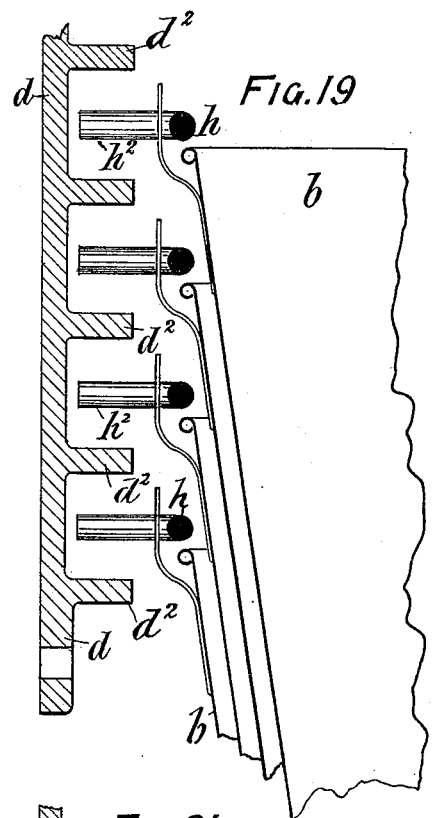
Figure 20:
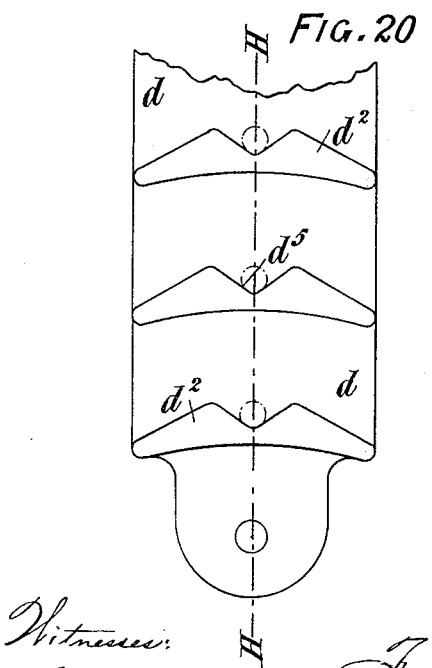
Figure 21:
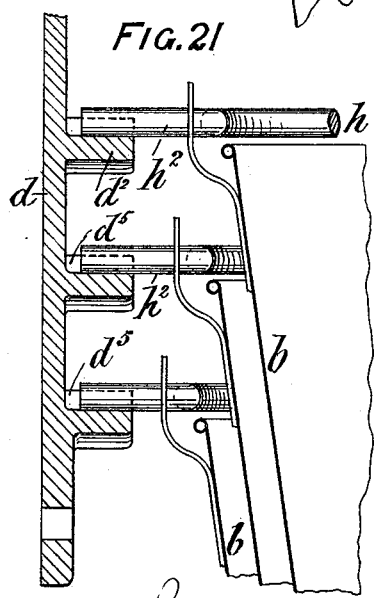
Figure 22:
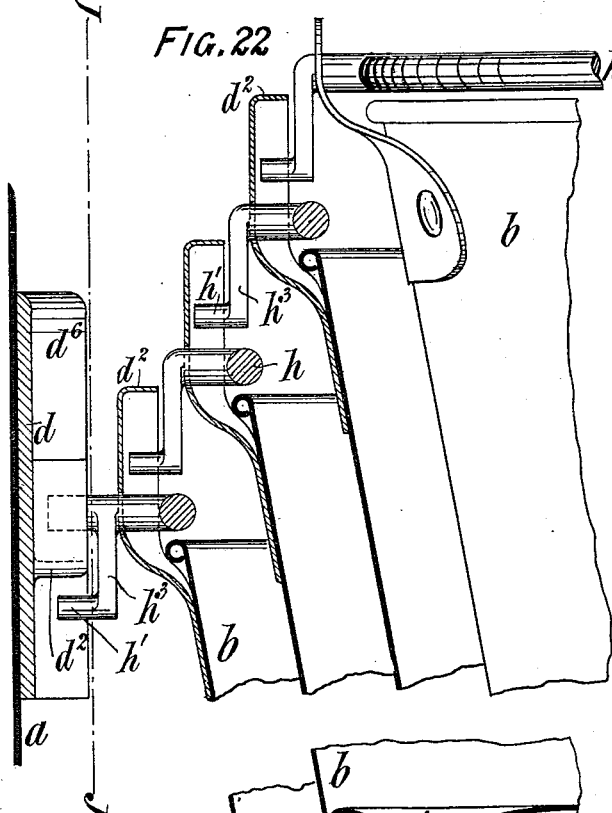
Figure 23:
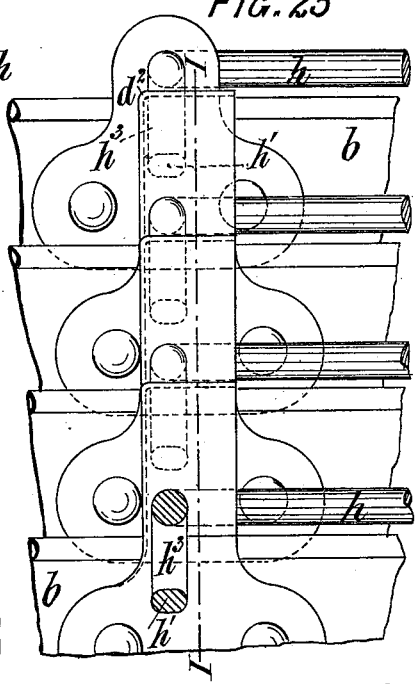
Figure 26:
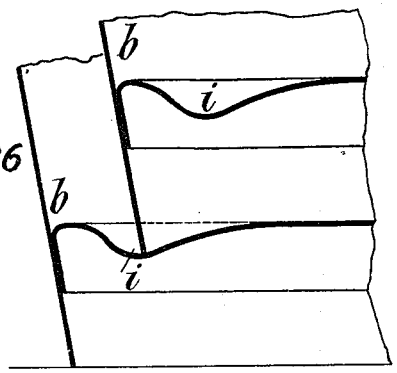
Figure 24:
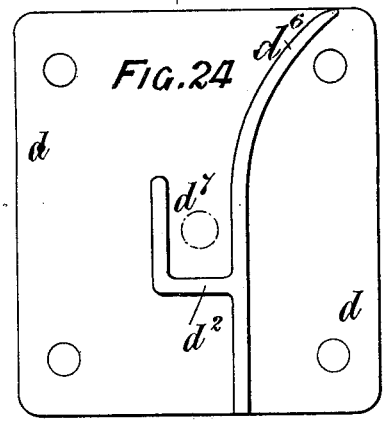
Figure 25:
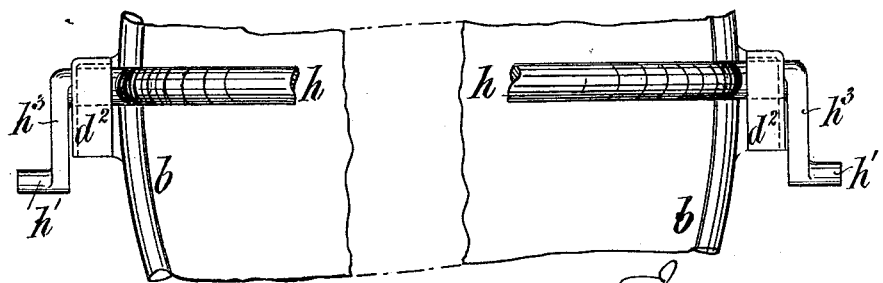
Figure 32:
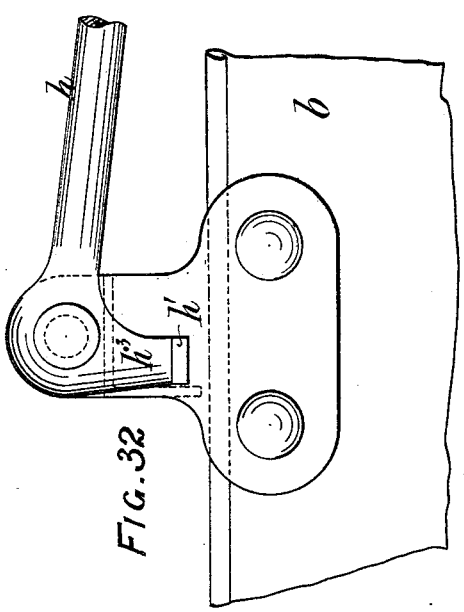
Figure 34:
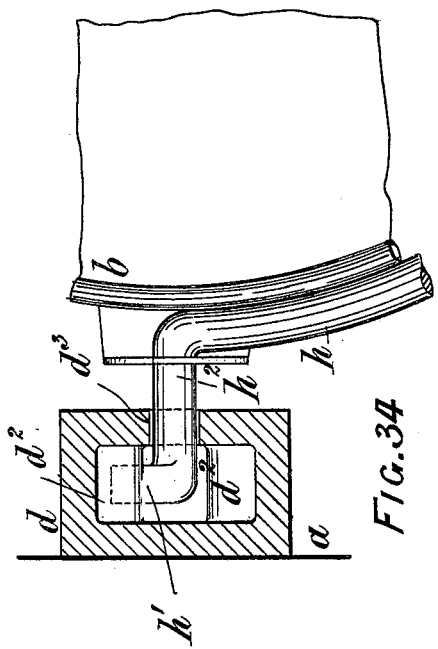
Figure 31:
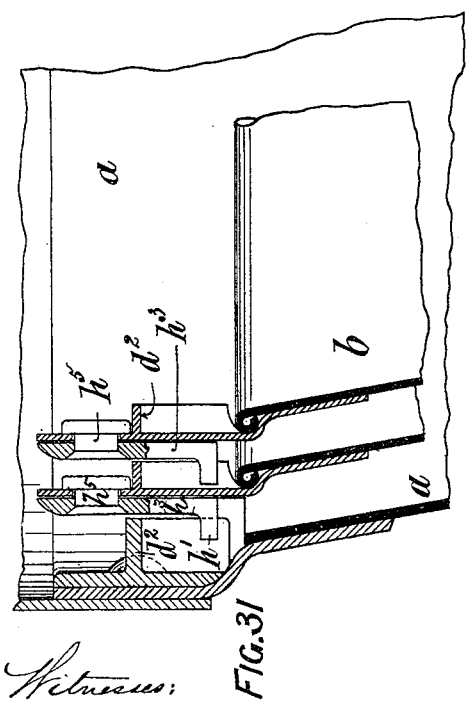
Figure 33:
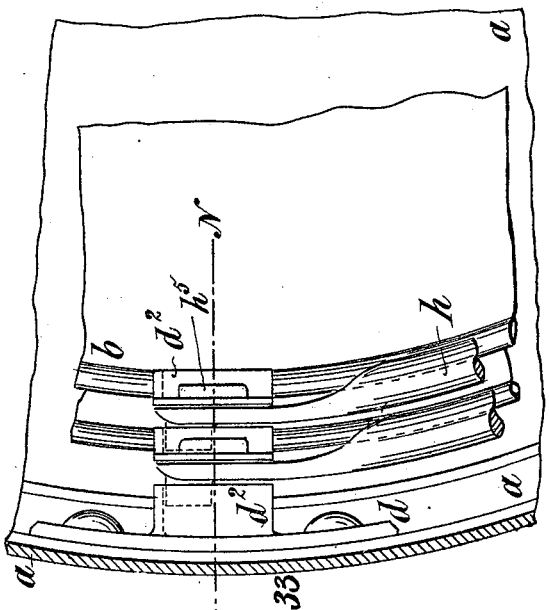

Figure 1 is a sectional elevation, on the line A B of Fig. 2, of a tank stored with pails all of the same size, showing the pails without their handles and fittings. Fig. 2 is a sectional plan on the line C D of Fig. 1, and showing the pails in position. Fig. 3 is a like sectional plan of a tank with pails similarly arranged; but in this case the tank is of sufficient size to take four sets of pails. Fig. 4 is a sectional elevation, on the line E F of Fig. 5, of a tank in which is stored a set of pails of graduated or progressive sizes. The tank and pails are shown without fittings. Fig. 5 is a plan of the tank shown in Fig. 4, with the cover, pails, and mop removed. Fig. 6 is a sectional elevation, on the line G H of Fig. 7, of a tank in which is stored a set of pails of uniform size (shown in elevation) in conjunction with a set of pails of graduated or progressive sizes. (Shown in section.) The tank and pails are shown without fittings. Fig. 7 is a sectional plan of Fig. 6 on the line I J, with the upper set of pails (namely, those of uniform size) removed. Fig. 8 is an elevation, partly in section, (the section being taken on the line K L of Fig. 9,) of a tank arranged as a seat or settee, in which are stored two sets of pails of graduated or progressive sizes. The tank and pails are shown without the fittings. Fig. 9 is a plan, partly in section, of the tank shown in Fig. 8. The section is taken on the line M N of Fig. 8. Fig. 10 is an enlarged view of a portion of the sectional elevation of the tank and pails shown in Fig. 1, showing their handles and fittings, and with the uppermost pail in elevation. Fig. 11 is a sectional plan on the line O P of Fig. 10. Fig. 12 is a sectional elevation, the upper part on the line A A and the lower part on the line B B of Fig. 11, of the holding-down fittings, with stops on one side only suited to the arrangement shown in Figs. 1, 2, 3, 10, and 11. Fig. 13 is a form of holding-down fittings with two rows of stops $d^2$, the upper part in section on the line A A and the lower part in section on the line B B of Fig. 14. Fig. 14 is a sectional plan of the above Fig. 13 on the line C C, showing (in section) the fitting and side of the tank to which it is attached and a portion of a pail in position. Fig. 15 is a sectional elevation, on the line D D of Fig. 17, (with a portion of the uppermost pail in elevation,) showing a form of holding-down fittings (on an enlarged scale) suited to the arrangement shown in Figs. 8 and 9. Fig. 16 is a sectional elevation on the line E E of Fig. 15. Fig. 17 is a sectional plan on the line F F of Fig. 15, showing a portion of the lowermost pail in position. Fig. 18 is a front elevation of a form of holding-down fittings, wherein a partial rotation of the pails in either direction releases the same. Fig. 19 is a sectional elevation on the line G G of Fig. 18, showing portions of the pails in position with regard to this form of holding-down fittings. Fig. 20 is a front elevation of another form of holding-down fittings, wherein a partial rotation of the pails in either direction releases the same. Fig. 21 is a sectional elevation on the line H H of Fig. 20, showing portions of the pails (of graduated sizes) in their positions with regard to this form of holding-down fittings—namely, suspended by means of the trunnions to the handles resting on the stops. Fig. 22 is a sectional elevation on the line I I of Fig. 23, (with a portion of the uppermost pail shown in elevation,) illustrating a form of fittings suited to pails of graduated or progressive sizes, as shown. The holding down in this case is between pail and pail, the holding-down fittings for the lowermost pail alone being, as here shown, attached to the tank. Fig. 23 is a sectional elevation on the line J J of Fig. 22. Fig. 24 is a face view of the before-mentioned holding-down fittings for the lowermost pail. Fig. 25 is a part plan of one of the pails, (with its fittings,) as shown in Figs. 22 and 23. Fig. 26 is a sectional elevation of the lower portions of two pails, having annular recesses provided to insure the concentricity of position, as shown. Fig. 27 is a sectional elevation on the line K K of Fig. 28, (with the portion of the uppermost pail shown in elevation,) illustrating a form of fittings suited to pails of uniform size, as shown, where the holding down is between pail and pail, the holding-down fittings of the lowermost pail alone being attached to the tank. This lowermost fitting is shown in position and is similar to that shown in Fig. 24. Fig. 28 is a sectional elevation on the line L L of Fig. 27. Fig. 29 is an elevation, partly in section, of the lowermost pail, (the section being on the line M M of Fig. 30,) illustrating a form of fittings suited to pails of graduated or progressive sizes, as shown, where the holding down is between pail and pail, except the lowermost pail, whose holding-down fittings (here shown in section) are attached to the tank. In this case we give a partial rotation to the pails in one direction to release the same. Fig. 30 is a front elevation of Fig. 29 with the tank-fitting $d$ removed. Fig. 31 is a sectional elevation on the line N N of Fig. 33, illustrating a form of fittings suited to pails of graduated or progressive sizes and adapted to the arrangement shown in Fig. 4, where the holding down is between pail and pail (except the lowermost pail, the holding-down fittings of which are, as shown, attached to the tank.) Fig. 32 is a face view of a portion of a pail and its fittings shown in Fig. 31. Fig. 33 is a plan of Fig. 31. Fig. 34 is a sectional plan of an arrangement of holding-down fittings, similar to those shown in Figs. 13 and 14, but with the projections on the trunnions of the handle turned in a reverse direction. Fig. 35 is a sectional elevation of the top portion of a pail, in which the last-mentioned arrangement is used, in conjunction with a spring-catch, to secure the handle. Fig. 36 is a plan of a pail with the handle enlarged to give extra weight to the same, to check any tendency it may have to rise in those cases where we use a handle with projections on the trunnions of the same, turned in a reverse direction to the handle, as before described in Fig. 34. Fig. 37 is a sectional elevation on the line $o\ o$ of Fig. 38, and shows another mode of carrying out the holding-down fittings suitable to the general arrangement illustrated in Figs. 1, 2, and 3. Fig. 38 is a sectional plan on the line P P of Fig. 37. Fig. 39 is a part sectional elevation on the line P' P' of Fig. 37. Fig. 40 is a part elevation, with the tank fitting in section, of an arrangement suited to pails of ordinary construction of uniform size. Fig. 41 is a sectional plan on the line $P^2 P^2$ of Fig. 40. Fig. 42 is a sectional elevation on the line Q Q of Fig. 43, showing an arrangement of holding down by attachments to the lower part of the pails, wherein a partial rotation in either direction releases the pails. Fig. 43 is a sectional plan on the line R R of Fig. 42. Fig. 44 is a sectional elevation on the line S S of Fig. 45, where an arrangement of holding down similar to that illustrated in Fig. 42 is used, but where a partial rotation in one direction only releases the pails. Fig. 45 is a section on the line T T of Fig. 44. Fig. 46 shows the accompanying opposite section to that shown by Fig. 45, illustrating the holding-down fittings on that side. Fig. 47 is an internal face view of one part of the holding-down fittings shown in Figs. 44 and 45.

Figs. 1 and 2 show a form of tank where we store two sets of pails $b$. One set of pails is shown in section and the other set in elevation. $c$ is an easily-removable cover. $d\ d$ are the holding-down fittings attached to the tank $a$, or to the stay-bars $d'$, which also serve to strengthen the tank. $e$ is the level of water in the tank. $g\ g$ are holes or slots in the bottom rim of the pail, for the purpose of allowing the escape of air from the cavity formed by the rim and for allowing the cavity to be filled with water.

A similar arrangement, but for storing four sets of pails, is shown in Fig. 3. In this tank we prefer to place a division $a'$, to insure the equal distribution of water among the whole of the pails, so that no pail be left deficient of water, which would otherwise take place without such division were the whole of the three sets of pails to be extracted before removing any pail of the fourth or remaining set.

Figs. 4 and 5 show a form of one of our tanks, in which we shape the lower part of the tank $a$ to the configuration of the pails $b$. The pails here shown are of graduated sizes, both as regards diameter and height, all their rims rising to the same level. We sometimes, in conjunction with our tanks and pails, provide a hand-pump, syringe, or a mop $k$, the latter preferably with a jointed handle, as here shown, for the more effectually applying the water to any locality where the fire may exist.

A form of tank suitable for occupying the corner of a room or hall is shown in Figs. 6 and 7, here provided with one set of pails of uniform size and another set of graduated sizes in both dimensions.

Where circumstances restrict the height, we arrange our device in the form of a seat or settee, as shown in Figs. 8 and 9, the deficiency in height being overcome by a suitable increase of the superficial area of the tank. The pails $b$ are preferably shown in the wells $a^2$ at the ends of the settee, the wells $a^2$ being partially hidden from outside view by the legs $f$ of the settee, as shown. We prefer to place a division $a'$ in the center of the tank $a$, to insure the proper distribution of the water to the two sets of pails, as already explained in the case shown in Fig. 3.

Figs. 10, 11, and 12 show enlarged views of a portion of the tank $a$, pails $b\ b$, and fittings $d$. (Shown in Figs. 1 and 2.) In this case any tendency of the pails to rise (which are of the same size) is checked by the projections $h'\ h'$ on the ends of the prolonged trunnions $h^2$. The projections $h^2$ stand in the same direction as the handle $h$, and it will be observed that when the handle is horizontal or lying on the rim of the pail the projections $h'$ on the end of the trunnions $h^2$ also lie in a horizontal direction, (namely, in the direction shown in Figs. 11 and 12,) and when so directed the projections $h'$ cannot pass the stop $d^2$ on the holding-down fitting $d$, and thus the pail, when the handle is down, is secured from rising. When the handle $h$ of the uppermost pail is raised preparatory to the pail being lifted out, the projections $h'$ will point upward or take a vertical direction, and thus avoid contact with the stops $d^2$, allowing the pails $b$ to be lifted and withdrawn. The slot $d^3$ guides the pails by means of the trunnions $h^2$ to and from their position in the tank. The upper part or inlet to the slot $d^3$ is bell-mouthed, as shown at $d^4$, to assist the entry of the trunnions of the pails into the fittings. In this form of fittings the handles $h$ of the pails always rest on the same side of the pails. In the modified form of fitting shown in Figs. 13 and 14 we place the stops $d^2$ on both sides of the fittings $d$, so that the handle may rest or lie on either side of the pail.

Figs. 15, 16, and 17 further illustrate our method of holding down as applied to our tanks and pails. In the present case the fittings are shown suited to the general arrangement illustrated in Figs. 8 and 9. In the tank-fittings $d$ (here shown) it will be noticed that as the stops $d^2$ are on one side only the handle $h$ will always fall on one side; but it will be evident that these stops $d^2$ can be provided on both sides of the fitting $d$, so as to allow the handles $h$ to fall either way in a similar manner to that shown in Figs. 13 and 14. In some cases we hold down the pails by simply prolonging the trunnions $h^2$ of the handle $h$ in the manner shown in Figs. 18, 19, 20, and 21, so as to be caught in their upward movement by the ledges or stops $d^2$ of the fittings $d$, attached to the tank, the releasing being effected by the partial rotation of the pails in either direction.

In Figs. 18 and 19 the prolonged trunnions $h^2$, when the pails are in position, stand freely between the ledges or stops $d^2$, each pail resting on the one below it, except the lowermost pail, which rests on the tank. The ledge or stop $d^2$ is made of any suitable form. That shown in Figs. 20 and 21 is so constructed that the trunnions $h^2$ of the handle $h$ rest in the recess $d^5$ formed in the ledge or stop $d^2$.

In some cases we arrange the holding-down fittings between a pail and the pail next below it, the holding-down fitting of the lowermost pail only being secured to the tank. Various forms of fittings illustrating this method of holding down the pails are shown in Figs. 22, 23, 25, 27, 28, 31, 32, and 33, in which the raising of the handle, as before described, (preparatory to the pail being lifted,) releases the pail. Figs. 22, 23, and 25 show this method of holding down between pail and pail applied to pails of graduated sizes. Figs. 27 and 28 show it applied to pails of uniform size. In these last-mentioned arrangements we form upon or fix to the trunnions $h^2$ a crank-arm $h^3$, and upon this crank-arm $h^3$ we mount or form pins or projections $h'$. The projections $h'$ stand under the stops $d^2$ when the handle $h$ is down or resting upon the rim of its pail; but when the handle is raised to a vertical position the projections $h'$ on the same are then clear of the stops $d^2$, thus enabling the pail to be withdrawn from the tank.

Figs. 31, 32, and 33 also show the above method adapted to pails of graduated sizes, standing with their rims at one uniform height when telescoped. Here the crank $h^3$, which has the projection $h'$ on its extremity, is formed directly in one with the boss of the handle, the latter being jointed to the fitting on the pail by the pin $h^5$.

Fig. 24 shows the fitting attached to the tank for securing the lowermost pail as used in combination with the arrangements shown in Figs. 22, 23, 25, 27, and 28. This fitting is formed so as to serve as a guide in placing that pail in position, the curved portions $d^6$ guiding the pail by means of its trunnions into the lower part $d^7$ of the guide, the bottom portion $d^2$ of which performs the part of a stop to the lowermost pail.

When we release by partial rotation the pail, the fittings are constructed as shown in Figs. 29 and 30, which fittings are adapted to rotation in one direction only. When we arrange the fittings for releasing in either direction, we widen the stop-piece $d^2$ and remove the return portion $d^7$.

Referring to Fig. 26, before described, $b$ is the pail, and $i$ is the annular recess in the bottom of the same for the purpose of keeping the pails in their proper position with respect to each other, as before mentioned.

A modified form of holding-down and handle fittings is shown in Fig. 34. In this case the projection $h'$ stands in the opposite direction with regard to the handle to that shown in Fig. 17, and the fitting $d$ is here provided with a double row of stops $d^2$, so that the handle $h$ may be allowed to fall on either side of the pail. When we use a projection so related with regard to the handle, we sometimes prefer to catch or hold the handle by a spring-catch $j$, as shown in Fig. 35, or give extra weight to the handle $h$, as shown in Fig. 36, for greater security in holding down.

In the additional methods of holding down the pails shown by Figs. 37, 38, and 39, suitable for use in combination with the general arrangement shown in Figs. 1, 2, and 3, the stops $d^2$ are placed on one side only of the fittings $d$, which are attached to the tank $a$. The projections $h'$ on the trunnions of the handles are so constructed that when the handle lies on the rim of the pail the projections $h'$ are in a position to be caught by the stops $d^2$; but when the handle is raised they are, by reason of the cranked form given to the ends of the trunnions $h^2$, turned to one side of the stop $d^2$, and so offer no obstruction to the pail being lifted out of or placed in the tank.

An arrangement in which pails of uniform diameter and of the ordinary construction are used is shown in Figs. 40 and 41. In this case the stop-fittings $d$, attached to the tank, are similar to those shown in Figs. 18 and 19, the releasing being effected by the partial rotation of the pail in either direction. In this case the pails $b$ are suspended by the usual curled or ringed end $h^4$ of the handle $h$, resting on the ledge or stop $d^2$. These ledges are placed at a distance apart suitable to the pails.

Figs. 42, 43, 44, 45, 46, and 47 show further methods of securing or preventing the pails from rising. In this case attachments are fixed to the lower part of the pails.

In Figs. 42 and 43 (in which the connection is between pail and pail) the pails are released by partial rotation in either direction, the stud or projection $h'$ being caught by the stop-piece $d^2$ on the pail next below it. The stop $d^2$ for the lowermost pail is attached to the tank.

Figs. 44, 45, 46, and 47 show an analogous arrangement to that last described, with the exception that the releasing or disengaging of the pail is by partial rotation in one direction only, the return portions $d^7$ of the stop $d^2$, both in the pails and on the tank, forming a barrier or stop to rotation in the other direction.

We claim—

1. The combination of a fluid-containing tank and a series of pails telescoped one within the other and wholly submerged in the fluid in the tank and adapted to be individually removed filled with the fluid, substantially as described.

2. The combination of a fluid-containing tank and a series of tapering pails of gradually-reduced diameter arranged one within the other and all submerged in the fluid in the tank and capable of being successively removed filled with the fluid, substantially as described.

3. The combination of a fluid-containing tank having attached fittings $d$, provided with the stops $d^2$, and a series of submerged pails having swinging handles $h$, provided with trunnions $h^2$, having projections $h'$ to engage the stops, substantially as described.

4. The combination of a fluid-containing tank having attached vertically-slotted fittings $d$, provided with lateral stops $d^2$, and a series of submerged pails telescoped one within the other and provided with swinging handles $h$, having trunnions $h^2$ extending through the slots of the fittings and provided with projections $h'$, which engage the stops, substantially as described.

5. The combination of a fluid-containing tank, a series of pails telescoped one within the other and submerged in the tank, and means, substantially as described, for holding the pails in their telescoped position.

6. The combination of a fluid-containing tank, a series of submerged pails telescoped one within the other and provided with handles having projections $h'$, and devices engaging the projections to hold the pails submerged, substantially as described.

FREDERICK ALFRED MESSER.
WALTER FULLER THORPE.

Witnesses:
GEORGE C. DOWNING,
    8 *Quality Court, London.*
PERCY K. WOODWARD,
28 *Southampton Buildings, London, W. C.*